United States Patent Office 3,534,255
Patented Oct. 13, 1970

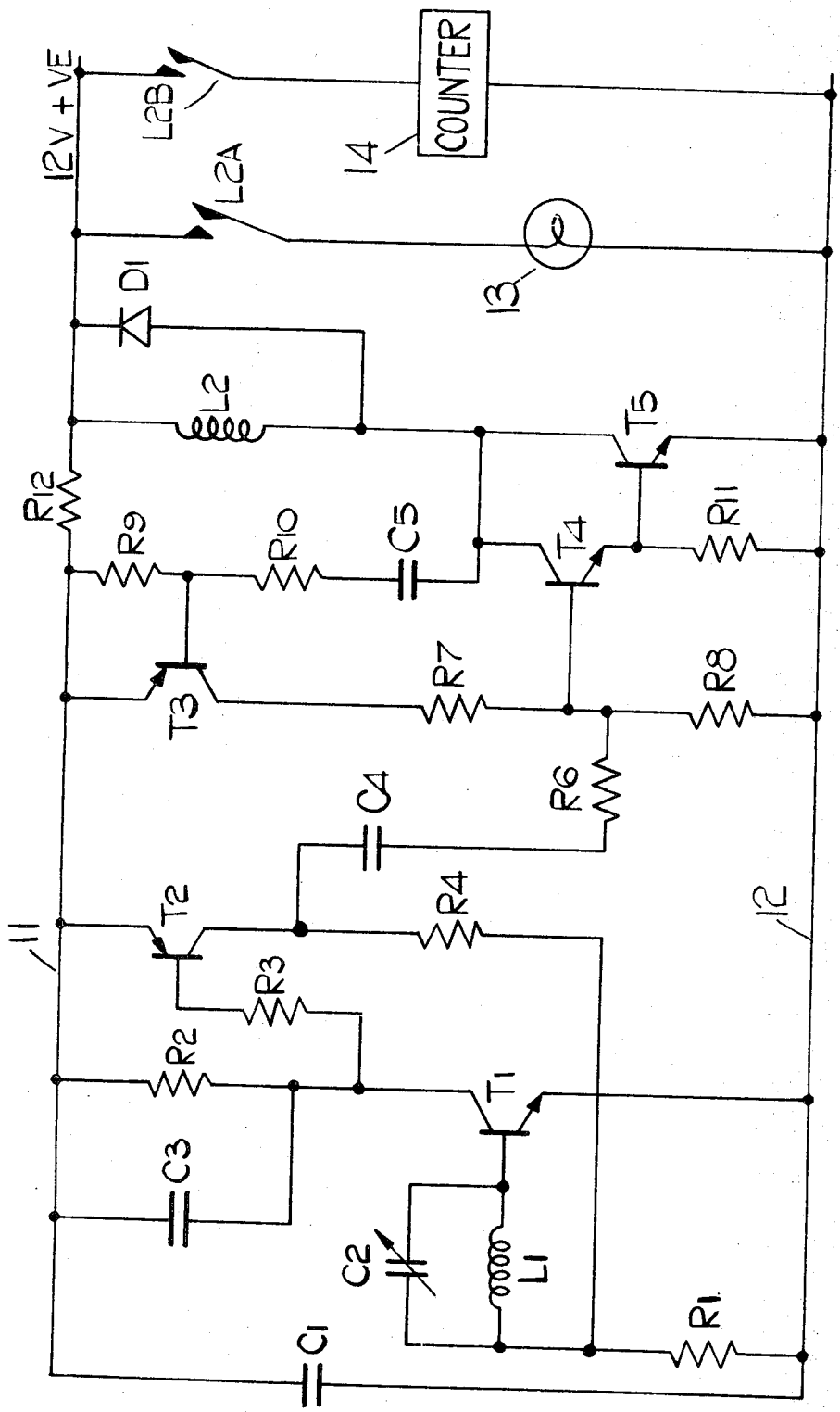

---

3,534,255
METERS FOR MEASURING THE USAGE BY A ROAD VEHICLE OF SELECTED ROADS AND PARKING SPACES
Malcolm Williams, Solihull, William Frank Hill, Stafford, and Lancelot Phoenix, Birmingham, England, assignors to Joseph Lucas (Industries) Limited, Birmingham, England
Filed Apr. 12, 1968, Ser. No. 720,843
Claims priority, application Great Britain, Apr. 14, 1967, 17,225/67
Int. Cl. G01r 33/00
U.S. Cl. 324—34                                    3 Claims

---

ABSTRACT OF THE DISCLOSURE

A meter is intended for attachment to a road vehicle, and operates a countereach time the vehicle passes over an alternating induction field of predetermined frequency, so that the owner of the vehicle can be charged for using particular roads. The meter includes an amplifier which has an input transistor and an output transistor, the output transistor being driven from the input transistor. A tuned circuit is provided in the base circuit of the input transistor, and provides the sole input thereto. When the input transistor conducts as a result of the vehicle passing over the induction field, the output transistor provides positive feedback to the input transistor, means also being provided to maintain the base current of the output transistor substantially constant when the input transistor conducts. The output transistor operates the counter.

---

If it is desired for taxation purposes to measure the usage by a road vehicle of selected roads and parking spaces, it is necessary to provide some form of meter on the vehicle for degistering passage of the vehicle past a given point, or the length of time for which the vehicle occupies a given parking space. If a continuous alternating induction field of specified frequency and amplitude is provided at selected points on a road, or an intermittent field is provided in a parking zone, then it is possible for a meter to be fitted to every road vehicle, the meter having therein a circuit which operates a counter in response to such a field. This invention provides a meter for this purpose.

The invention resides in a meter for attachment to a road vehicle for detecting the presence of an alternating induction field of predetermined frequency in the vicinity of said vehicle, the meter comprising an amplifier having an input transistor and an output transistor which receives base current and so conducts when the input transistor conducts, a tuned circuit in the base circuit of the input transistor, said tuned circuit being tuned to the frequency of said field, a positive feedback connection from the output transistor to the base of the input transistor, said positive feedback connection and said tuned circuit consisting the sole input to the base of the input transistor, means whereby the base current supplied to said output transistor is substantially constant when the input transistor is conducting, a counter, and means operable by the output from the output transistor for operating the counter once each time the output transistor conducts.

An example of the invention is illustrated in the accompanying circuit diagram.

Referring to the drawing, there is provided a positive supply line 11 which is connected through resistor R12 to the positive terminal of a battery, which can be a battery used only for operating the circuit shown, or can be the battery of the vehicle. Where the battery is not the vehicle battery, it can be charged by the battery charging system of the vehicle. The negative terminal of the battery is connected to a negative supply line 12, and the lines 11, 12 are bridged by a capacitor C1. Connected to the line 11 is one end of a resistor R2 which is bridged by a capacitor C3 and which has its other end connected to the collector of an n-p-n transistor T1. The transistor T1 has its emitter connected to the line 12, its collector connected through a resistor R3 to the base of a p-n-p transistor T2, and its base connected to the line 12 through an inductor L1 and a resistor R1 in series, the inductor L1 being bridged by a capacitor C2. The transistor T2 has its emitter connected to the line 11, its collector connected to the junction of the inductor L1 and resistor R1 through a resistor R4, and its collector further connected through a capacitor C4, a resistor R6 and a resistor R8 in series to the line 12. The junction of the resistors R6, R8 is connected to the base of an n-p-n transistor T4, and is further connected through a resistor R7 to the collector of a p-n-p transistor T3, the emitter of which is connected to the line 11. The transistor T4 has its emitter connected through a resistor R11 to the line 12, and further connected to the base of an n-p-n transistor T5 having its emitter connected to the line 12. The collectors of the transistors T4, T5 are interconnected and are connected in series to the line 11 through a capacitor C5, a resistor R10 and a resistor R9, the junction of the resistors R9, R10 being connected to the base of the transistor T3. The collector of the transistor T5 is further connected through a relay coil L2 bridged by a diode D1 to the positive battery terminal, the coil L2 serving to operate a pair of contacts L2A connected in series with a waring lamp 13 or some other form of indicating devise across the lines 11, 12, and further operating a pair of contacts L2B connected in series with a counter 14 across the lines 11, 12.

In the normal conditions of the circuit, no current flows in any part of the circuit. When the vehicle passes over a loop buried in a road, the loop producing an alternating induction field of a frequency to which the tuned circuit constituted by inductor L1 and capacitor C2 is tuned, then the transistor T1 is turned on by the energy transferred to the inductive circuit L1, C2 and conducts to provide base current to the transistor T2, conduction of which causes positive feedback to be applied to the transistor T1 through the resistor R4. The positive feedback ensures that the transistor T1 turns on rapidly, and the capacitor C3 maintains the base current to the transistor T2 substantially constant even though the transistor T1 is oscillating at the frequency of the alternating source. By virtue of the feedback through the resistor R4, the circuit continues to operate even though the field strength reduces as the vehicle passes through the field, but when the vehicle is beyond the influence of the field, the positive feedback is insufficient to maintain the transistor T1 conducting, and so the transistor T1 turns off, with consequential turn-off of the transistor T2.

The output from the collector of the transistor T2 is a square wave which is differentiated by the capacitor C4 and the resistor R6 to provide a positive spike at the commencement of the square wave and a negative spike at the termination of the square wave. The transistors T4, T5 form a Darlington pair, with high gain, and are turned on by the positive spike, conduction of the transistors T4, T5 turning the transistor T3 on, and the transistor T3 providing feedback to the transistor T4 until the capacitor C5 charges. Thus, the output from the transistor T5 will be a square wave pulse of period determined by the product R10C5. This pulse operates the coil L2 to operate the counter, and at the same time a warning is given. This warning can be to the driver, but in addition or alternatively, a warning may be given to an observer on the side of the road to indicate that the meter circuit is operating satisfactorily.

The purpose of the resistor R12 and the capacitory C1 is to prevent triggering of the circuit by supply transients. The resistor R9 determines the gain of the transistor T3.

A particularly convenient form of warning device for indicating to an observer that the meter is operating correctly consists of a plate having therein an arcuate aperture into which a coloured disc is moved by the relay coil.

Having thus described our invention what we claim as new and desire to secure by Letters Patent is:

1. A meter for attachment to a road vehicle for detecting the presence of an alternating induction field of predetermined frequency in the vicinity of said vehicle, the meter comprising an amplifier having an input transistor and an output transistor, means coupling the input and output transistor whereby the output transistor receives base current and so conducts when the input transistor conducts, a tuned circuit in the base circuit of the input transistor, said turned circuit being tuned to the frequency of said field and energized by said field, a positive feedback connection from the output transistor to the base of the input transistor, said positive feedback connection and said tuned circuit constituting the sole input to the base of the input transistor, means whereby the base current supplied to said output transistor is substantially constant when the input transistor is conducting, a counter, and means operable by the output from the output transistor for operating the counter once each time the output transistor conducts.

2. A meter as claimed in claim 1 in which said means operable by the output from the output transistor comprises a normally non-conducting monostable circuit which is turned on by the output from the output transistor to provide a signal to the counter, and a further transistor which is turned on when the monostable circuit conducts and provides an input to the monostable circuit for a period of time determined by a capacitor, so that the output to the counter is of square wave form.

3. A meter as claimed in claim 1 in which the current flowing through the circuit is at a minimum in the absence of an alternating induction field of said predetermined frequency.

References Cited

UNITED STATES PATENTS 2,917,732  12/1959  Chase et al.

FOREIGN PATENTS 1,232,879  1/1967  Germany.

ALFRED E. SMITH, Primary Examiner

U.S. Cl. X.R.

340—32